United States Patent [19]

Nixon

[11] Patent Number: 4,847,600
[45] Date of Patent: Jul. 11, 1989

[54] SON-AIR DETECTOR

[75] Inventor: Donald R. Nixon, Murrysville, Pa.

[73] Assignee: Westinghouse Electric Corp., Pittsburgh, Pa.

[21] Appl. No.: 55,401

[22] Filed: May 29, 1987

[51] Int. Cl.⁴ ............................................. G08B 21/00
[52] U.S. Cl. .................................. 340/621; 73/290 V
[58] Field of Search ............... 340/621, 618, 619, 620, 340/622–625; 73/290 R, 290 V, 305–307; 367/93

[56] References Cited

U.S. PATENT DOCUMENTS

| | | | |
|---|---|---|---|
| 3,407,398 | 10/1968 | Stearn | 340/621 X |
| 3,744,301 | 7/1973 | Arave | 73/290 V X |
| 3,949,360 | 4/1976 | Pignata et al. | 340/621 |
| 3,974,681 | 8/1976 | Namery | 73/600 |
| 4,083,225 | 4/1978 | Day et al. | 73/19 |
| 4,138,879 | 2/1979 | Liebermann | 73/19 |
| 4,144,517 | 3/1979 | Baumoel | 73/290 V X |
| 4,341,116 | 7/1982 | Bilstad et al. | 73/290 V |
| 4,465,437 | 8/1984 | Jensen et al. | 417/366 |

FOREIGN PATENT DOCUMENTS 802801 2/1981 U.S.S.R. ............... 73/290 V

OTHER PUBLICATIONS

Westinghouse Corp. Product Update 84-3, "Detectaire Protection for Boiler Circulating Pump".
Westinghouse Corp. Product Update 83-1, "Boiler Circulating Pump Venting".
Westinghouse Corp., "Mark IV Detectaire", Jul. 1960.

Primary Examiner—Joseph A. Orsino
Assistant Examiner—Jeffery A. Hofsass
Attorney, Agent, or Firm—B. R. Nath

[57] ABSTRACT

In fossil boilers and steam generator of fossil boilers and nuclear power plants, a son-air detector using ultrasonic transducers is employed with a glandless motor pump which may have a vertical top vent pipe to ascertain with fast response if the vent pipe has liquid or not. In the glandless motor pump, the pumped primary liquid per se is used for lubricating the bearings of the motor, whereby, if the lubricating liquid is absent, the motor operation should not be continued. For redundancy, a second transducer may be used, whereby when both the transducers are connected to simultaneously indicate absence of liquid in the vent pipe, suitable corrective action is initiated. A vent pipe filled with liquid will transmit ultrasonic bursts (provided by the transducer) through the liquid, so that the ultrasonic waves are reflected back. An empty vent pipe will not reflect the ultrasonic waves which would simply be dissipated. The motor pump also uses a wrap around type heat exchanger cooler which takes in plain cool water from the outside to cool the outside of the stator. The motor pump optionally is provided with a bearing water thermometer and a purge line.

9 Claims, 2 Drawing Sheets

SON-AIR DETECTOR

BACKGROUND OF THE INVENTION

1. Field of the Invention

This invention generally relates to an ultrasonic gas/liquid detection system to detect the presence/absence of liquid/gas in liquid pumps in general, and more particularly in glandless motor pumps which are in a steam generator loop of a fossil or nuclear steam generator.

2. Description of the Prior Art

Power generating plants use several electrical motors of various sizes for various purposes, the motors having electrical windings which need cooling for dissipation of heat generated in the motor windings. Invariably, motor windings in ordinary commercial applications are air cooled by a suction draft induced by fan means provided on the rotor of the motor. There are, however, some applications where the windings are totally enclosed or hermetically sealed, wherein a provision for heat dissipation must be made by a cooling fluid which is force-circulated in contact with "wet windings" to remove wet winding heat from the windings. In applications where an electric motor operates in association with a directly coupled pump to drive the pump, it is not uncommon to utilize the fluid driven by the pump to cool the inside of the motor to remove the heat generated by the motor windings. Expediently, in such instances, the fluid driven by the pump is also utilized for purposes of lubrication of the motor bearings; this is made possible by a construction known in the art as glandless motor pumps comprising (a) canned motors where the stator windings may not be cooled by the pump fluid, and (b) wet winding units where the motor stator winding is cooled by the pump fluid.

The use of canned motor and wet winding units as boiler circulating pump motors is not uncommon in steam cycle electrical generating plants. Reliability of the glandless motor pumps in electrical generating plants is a very significant requirement in power generating plants; it is of paramount importance especially in nuclear power plants wherein failure of a glandless motor pump can occur because of overheating caused by lack of cooling fluid for cooling the windings and the bearings. A lack-of-fluid situation is a very deleterious occurrence in glandless motor pumps whenever air or other gas is trapped inside the canned motor whereby the pump motor cavity is not vented. Accordingly, positive and timely detection of a lack of fluid situation is a very important requirement in glandless motor pumps especially where used for boiler fluid circulation. It is needless to emphasize that an improper and untimely occurrence of a lack of fluid situation in glandless motor pumps could result in damage to the power plant and harm to the operating personnel who might as a result be exposed to catastrophic consequences.

As additional structural features, these wet winding and canned motor units use no shaft seals or packing glands. Stainless steel alloys are used for important elements such as the rotor of the motor, the motor stator "can" and the pump labyrinth.

Considering the criticality of positively ascertaining if indeed a glandless motor pump has any air/gas which could potentially destroy the motor pump and more, certain kinds of detectors have been used hitherto. Of such detectors, the most notable ones have been the gas detectors known as Westinghouse Detectaires ®. The "Detectaires" have been generally capable of detecting the presence/absence of gas/air with a fair degree of certainty; notwithstanding, the response time of such detectors has been rather unduly long, with the result that, often, the long delay before detection has already initiated damage or other problems. Delays of over 30 seconds with known detectors such as the Westinghouse Detectaires have been reported, resulting in total irreversible failures of bearings and cans before corrective action could be initiated. Moreover, the known Westinghouse Detectaire systems are relatively expensive and cost in the range of over U.S. $10,000 per unit. There has been a need therefore for a relatively inexpensive and fast acting detector for gas/air trapped in glandless motor pumps, the detector having such response as would obviate the disadvantages of the prior art arrangements.

U.S. Pat. No. 4,341,116 to Bilstad et al. teaches a system for detecting the absence of a liquid in a liquid chamber. An ultrasonic signal is transmitted through the liquid chamber, and, a signal received through the liquid chamber is fed through a control circuit to a comparator. A difference between a reference voltage in the comparator and the control circuit output voltage indicates ehether or not there is liquid in the liquid chamber. In this arrangement there is no teaching of any glandless motor pump wherein the fluid per se which is pumped by the motor pump unit is used for cooling the motor windings and bearings. Also, there is no additional means in this prior art arrangement to cool the pumped fluid or to regulate the temperature of the cooling fluid within the liquid chamber in any manner.

U.S. Pat. No. 3,407,398 to R. J. Stearn teaches a liquid presence detector which is in the form of a probe. The probe comprises an electro-acoustical transducer at one end of a body and a reflector plate which is located spaced from the other end of the body. The presence of liquid in the space between the transducer and the other end is detected by the reflections emanating from the reflector plate. In this arrangement, the probe has to be necessarily immersed or lowered in the liquid, before the liquid presence can be detected.

U.S. Pat. No. 3,744,301 to Arave teaches a detector arrangement to indicate liquid level in a gasliquid mixture. An ultrasonic burst is propagated in a wire, and, the attenuation of the ultrasonic burst is measured to determine the void fraction in the gas liquid mixture. When there exists a layer of gas over a liquid, the detector arrangement can be used as a liquid level indicator. There is no teaching in this prior art reference of any glandless motor pump wherein the liquid per se which is pumped by the motor pump is used for cooling the motor windings and the bearings.

In U.S. Pat. No. 4,144,517 to Baumoel, an arrangement is taught wherein the presence or absence of a liquid at a particular location of a tank or a pipe is sensed through the wall of a container by a single ultrasonic transducer. The transducer is mounted secured to the container wall, and projects a longitudinal sonic beam in the container wall. The presence of liquid or gas in the container causes different degrees of interface ultrasonic reflections. The reflections are compared with known decay rates of the reflections to ascertain if the container was empty or full at the time of measurement. Output circuits are provided to furnish "empty" or "full" signals or other signals in response to fluid level measurements. However, in this prior art arrangement, use is made of a reference signal decay time, with which is compared a measured decay time for the signal to attenuate from a first reference level to a second level which is 20% of the first reference level. There is also a question in this cited art as to how well the transducer is coupled with the container, and, to accommodate for improper coupling, compensatory measures are discussed. Notwithstanding, this prior art arrangement is likely to pose a delay in obtaining a final signal, which delay might be undesirable for wet winding units of boiler (primary water) circulating pumps.

SUMMARY OF THE INVENTION

The object of the invention is to provide a "Son Air" detector in combination with a glandless motor pump unit, wherein a lack-of-fluid situation is diagnosed and signallled much faster than what is possible by using arrangements known in prior art.

Another object of the invention is to provide a Son-Air detector in combination with a glandless pump which is more economical and reliable than prior art arrangements.

The invention in its broad form resides in a glandless motor pump for pumping boiler water of fossil boilers and nuclear steam generators, comprising: a sealed enclosure housing an electrical motor with its stator, rotor and bearings and a coupled liquid pump, said liquid pump having a cavity with suction and discharge openings and a main impeller; a vent pipe for the pump cavity, said vent pipe having liquid communication with said cavity first and second ultrasonic sensors mounted on and coupled with said vent pipe, said sensors having means to send out ultrasonic bursts and to receive reflected ultrasonic signals from within said vent pipe when said vent pipe is filled with liquid, to produce first and second output signals, and third and fourth signals when said vent pipe is devoid of liquid; and wiring means to connect said first, second, third and fourth sensors to relay means and an alarm and trip circuit to initiate action to cause the steam generator to shut down in the event said third and fourth signals both occur simultaneously. Instead of two transducers being used, a single transducer may be used as well, to obtain the same speed of detection.

In a preferred embodiment of the invention described herein, the pressure of the primary water completely fills all spaces between the rotor and the stator can, and provides lubication for the bearings. An auxiliary impeller (28) provides circulation of fluid from the rotor and bearing area through a wrap-around coil heat exchanger (26), thus dissipating motor heat to the secondary cooling water.

The stator winding of the motor is completely isolated from the pumped primary water by a high resistivity corrosion proof "can". Expediently, in order to withstand the relatively higher temperatures encountered, class "H" insulation may be used. Other types of insulation and other forms of construction to cater the isolation requirements and temperature withstand requirements are within the skill of one who is skilled in the art.

The bearings are preferably made of a carbongraphite compacted material and are designed to be lubricated by the pumped primary water.

Typically, the motor may have an electrical capacity of 335 to 510 Kw at a line voltage anywhere from 44V to 4400 V, and a synchronous speed of 1800 rpm. The maximum suction temperature for the pump may be in the range of (350° C. to 390° C.) 665° F. to 735° F. The rotor of the motor is advantageously of the squirrel-cage type, made of corrosion resistant stainless steel laminations. Other alternative forms of construction and materials may be employed and are within the ability of one who is skilled in the art.

The totally enclosed construction of the glandless motor pump permits complete independence from dirt, moisture and temperature of the surroundings. Also, in as much as no shaft extensions are used in the motor pump construction, no shaft seals or packing glands are required to be used.

BRIEF DESCRIPTION OF THE DRAWINGS

A more detailed understanding of the invention may be had from the following description of a preferred embodiment given by way of example and to be understood in conjunction with the accompanying drawing in which.

DESCRIPTION OF THE PREFERRED EMBODIMENT

Figure 1:
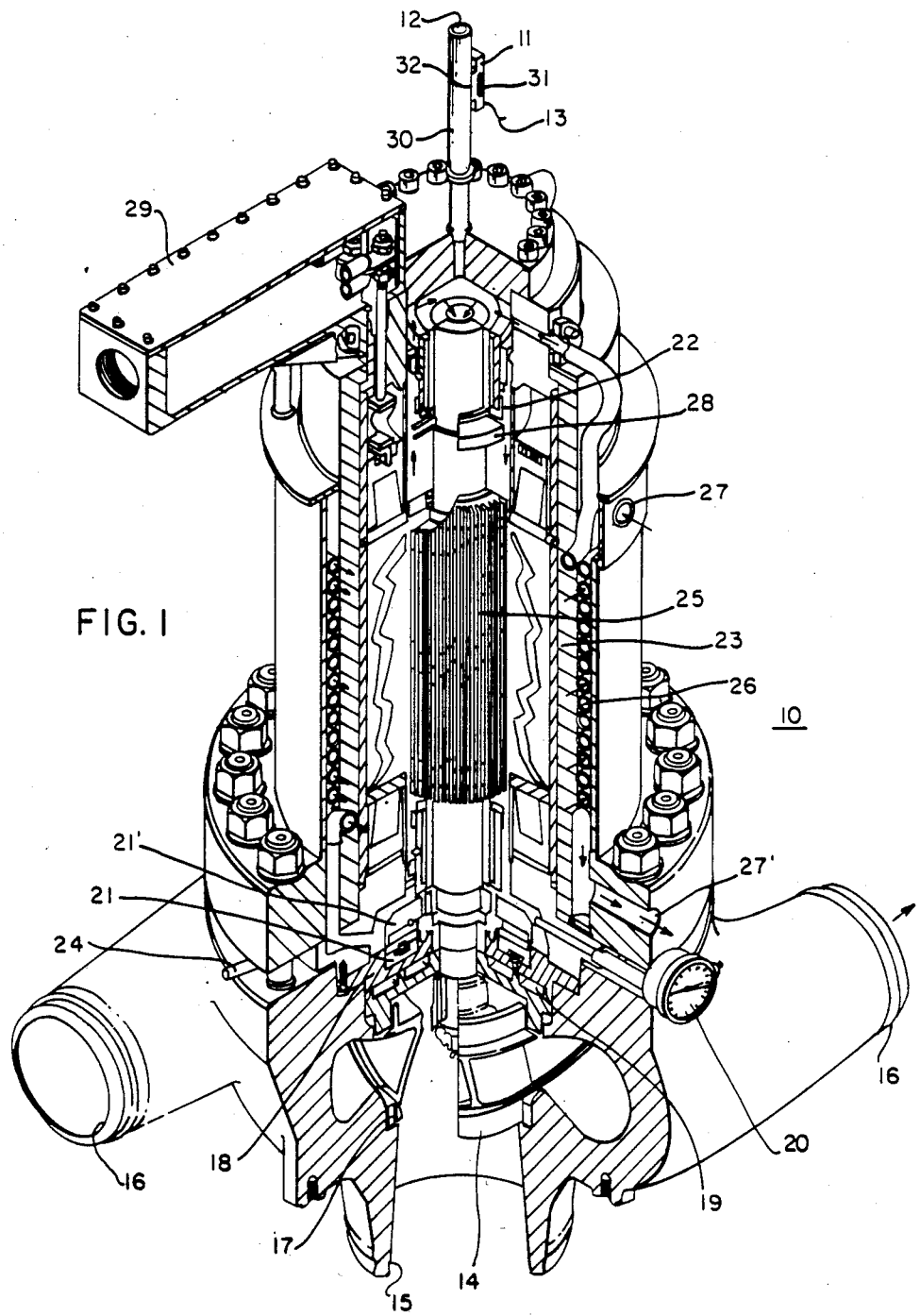
FIG. 1 is a pictorial cross sectional view of the Son-Air Detector.

As illustrated, FIG. 1 shows a pictorial cross section of a boiler circulating pump which embodies the "Son Air" detector of the invention.

A glandless motor pump in the form of a canister with totally enclosed windings is illustrated to show a preferred embodiment of the invention at 10 wherein (boiler) primary water is taken into the pump at suction nozzle 15 for delivery at discharge nozzles 16. The pump includes a main impeller 14 and a labyrinth seal 17 as is known in the prior art in connection with constructional arrangements for centrifugal and other pumps. The motor pump also incorporates a thrust bearing 21 and a thrust runner 21' since in the illustrated construction there are vertical thrusts in view of the motor pump shaft being vertical in use. However, it is not essential that the motor pump shaft should be vertical. The motor pump unit also features a purge line 24.

The totally enclosed motor features rotor 25 and a stator can 23, in addition to an upper radial bearing 22.

An auxiliary impeller 28 serves to ensure the presence of boiler 2ater at the vent 12. The auxiliary impeller also provides circulation of fluid from the rotor and bearing area through a wrap around coil heat exchanger 26, thus dissipating motor heat to secondary cooling water flowing in the coil of the heat exchanger 26. Cooling water inlet 27 and outlet 27' serve to keep the secondary cooling system, i.e., heat exchanger 26, filled with circulating cooling water. The temperature of the cooling water which cools the bearings in use is indicated by the bearing water thermometer 20.

A vent pipe 12 is provided to be fluid communication with the primary internal water which provides the canister plenum. It is to be noted that there is fluid communication between the primary water which fills the motor pump and the primary internal water which fills the vent pipe 12. The exploded view of the sensor in the Son Air detector is given in FIG. 1. The vent pipe wall is designated by the numeral 30; on the pipe wall is mounted the sensor 11, preferably using an epoxy compound or other suitable coupling compound. In addition, a mounting strap (not shown) may be used in hole 31 to mount the sensor 11 securely in place on the vent pipe. In order to facilitate electrical connections to and from the sensor, a terminal box 29 is provided. The sensor includes an ultrasonic transducer which is known per se.

Ultrasonic "bursts" are transmitted from the transducer through the vent pipe wall which acts as a water pressure boundary. Because of the construction of the pump described herein, if there is suction of primary water at suction nozzle 15, then, the auxiliary impeller will ensure that there is liquid in the vent pipe. If there is liquid present in the vent pipe, the ultrasonic burst will be transmitted as a wave to the opposite side of the vent pipe and be reflected back to the sensor. If no liquid is present in the vent pipe on the other hand, the burst of energy will dissipate, and, there is no reflection of the ultrasonic burst.

The output of the ultrasonic sensor can be connected to a relay system to trigger a signal generator and/or an alarm system, (not shown, which can be located at the site of the pump or at a remote location, e.g., the control room of a power station.

Coaxial cables may be used for the wiring from the sensor to the terminal box 29 and from the terminal box to further controls.

Figure 2:
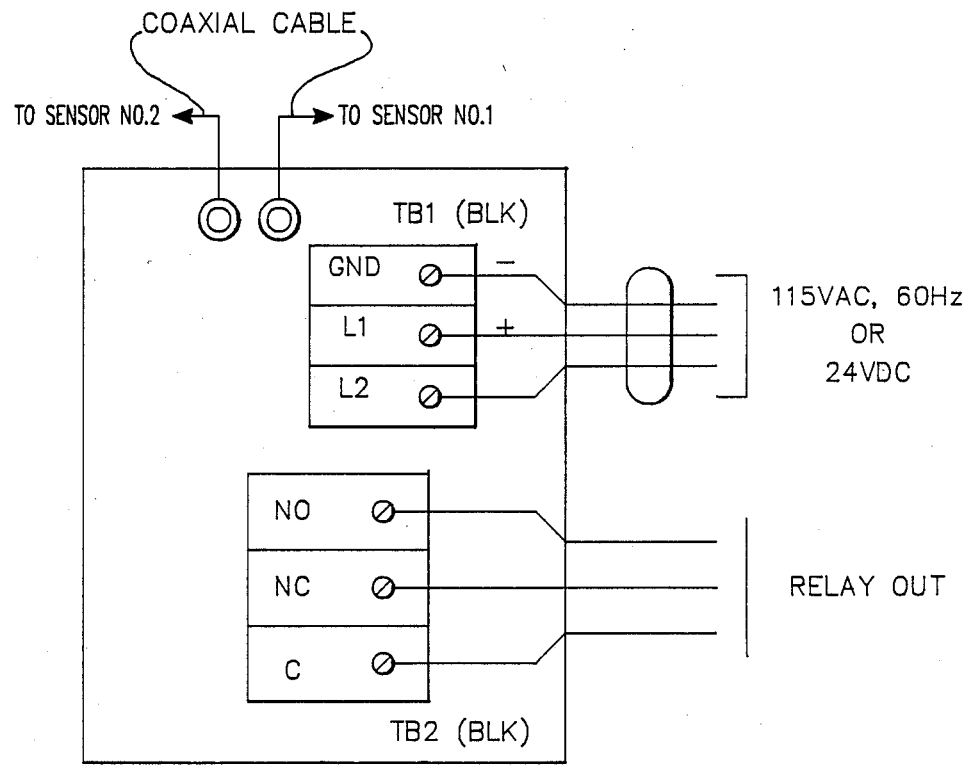
FIG. 2 is a diagrammatic representation of the connections for signals from the Son-Air detector.

FIG. 2 diagrammatically illustrates terminal blocks for a relay and the control power supply. For the sake of redundancy, a second sensor may be mounted on the vent pipe, to increase reliability of detection. With such an arrangement, the sensors can be arranged to produce first and second signals respectively when the vent pipe is filled with liquid, and, third and fourth signals respectively when the vent pipe is devoid of liquid. When the third and fourth signals simultaneously indicate lack of liquid in the vent pipe, it is unsafe to continue operation of the glandless motor pump. Immediately, the third and fourth signals can be used to raise an alarm or operate a relay or trip circuit to initiate appropriate corrective action or a shut down of the steam generator if necessary. From practical experiments, it was ascertained that with a vent pipe for example, of 1 inch (2.5 cm) size and schedule 160 stainless steel, the response time for detecting presence/absence of fluid was less than one second, using the apparatus as described herein.

Expediently, the Son Air Detector described herein incorporates a secondary cooling system heat exchanger 26 which includes cooling water inlet 27 and outlet 27'. Secondary or external cooling water is circulated in heat exchanger 26, which, as shown is a single helical coil which surrounds the stator core. Other alternative constructions including for example a multilayer helical coil or a non-helical coil are also envisaged. The external cooling water maintains the temperature of the primary water inside the motor pump can, by removing heat from the motor.

The boiler circulating pump may optionally be provided with a bearing water thermometer 20 to provide a visual indication of the bearing water temperature. A purge line 26 may be used to drain the liquid cavity for maintenance purposes if necessary.

As described hereinabove, the apparatus of the invention provides a very fast and failsafe detection of a lack-of-liquid condition inside a glandless motor pump in an economical and failsafe manner. For increased reliability of detection, the apparatus uses first and second transducers which simultaneously provide signals to indicate that the vent piipe which is connected to the pump cavity indeed contains liquid. The glandless motor pump described hereinabove incorporates features which enhance the reliability and performance of the pump when used in the context of a nuclear steam generator.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A glandless pump motor for pumping boiler water of a fossil or nuclear steam generator, comprising:
    a sealed enclosure housing an electrical motor with its stator, rotor and bearings and a coupled liquid pump, said liquid pump having a cavity with suction and discharge openings and a main impeller, said electrical motor in use being cooled by liquid which is pumped by said liquid pump;
    a vent pipe for the pump cavity, said vent pipe having a liquid communication with said cavity;
    a first and second ultrasonic sensors mounted on and coupled with said vent pipe, said sensors having means to generate ultrasonic bursts and to receive reflected ultrasonic signals from within said vent pipe and adapted to produce first and second output signals when said vent pipe is filled with liquid, and third and fourth signals when said vent pipe is devoid of liquid; and
    wiring means adapted to conduct said first, second, third and fourth signals to relay means and an alarm and trip circuit to initiate action to cause at least the pump motor to shut down in the event said third and fourth signals both occur simultaneously.

2. A glandless pump motor as in claim 1, wherein the motor rotor is of squirrel cage construction, using corrosion resistant stainless steel laminations.

3. A glandless pump motor assembly as in claim 1, wherein th bearings are made of compacted carbon graphite material.

4. In combination, a glandless pump motor for pumping boiler water of a fossil steam generator, or for pumping reactor main coolant in a nuclear steam generating system, comprising:
    a hermetically sealed electrical motor with its stator, rotor and bearings and a coupled driving pump, said driving pump having a third cavity with suction and discharge openings and a main impeller;
    a vent pipe for the motor pump, said vent pipe having liquid communication with said fluid cavity;
    an ultrasonic sensor mounted on and coupled with said vent pipe, said sensor having means to generate ultrasonic bursts and to receive reflected ultrasonic signals from within said vent pipe to produce an output signal to indicate absence of liquid in the vent pipe,
    a heat-exchanger cooling coil coaxial with the rotor and disposed radially outside of said stator;
    an auxiliary impeller disposed within said sealed can and driven by said electrical motor and providing circulation of liquid from the rotor and the bearings through said wrap around heat exchanger cooling coil for assisting in dissipating heat from the electrical motor and bearings.

5. A glandless pump motor assembly as in claim 4, wherein the motor rotor is of squirrel cage constrcution using corrosion resistant stainless steel.

6. A glandless motor pump assembly as in claim 4, wherein the bearings are made of compacted carbon graphite material.

7. A glandless pump motor assembly as in claim 4, including a second ultrasonic sensor, for redundancy, including wiring means to connect output signals of said sensors to a relay and an alarm/trip circuit.

8. A glandless pump motor assembly as in claim 5, wherein said motor rotor uses corrosion resistant stainless steel laminations.

9. A glandless motor assembly as in claim 5 wherein, said motor rotor uses corrosion resistant stainless still in solid form.

* * * * *